United States Patent [19]

Jabarin et al.

[11] Patent Number: 4,713,269

[45] Date of Patent: Dec. 15, 1987

[54] HEATSET MULTILAYER CONTAINER

[75] Inventors: Saleh A. Jabarin, Holland; Prakash R. Ajmera, Toledo, both of Ohio

[73] Assignee: Owens-Illinois Plastic Products Inc., Toledo, Ohio

[21] Appl. No.: 841,651

[22] Filed: Mar. 20, 1986

[51] Int. Cl.[4] .................................................. B65D 1/40
[52] U.S. Cl. ...................................... 428/35; 428/480; 428/911; 525/444; 525/933
[58] Field of Search ............................ 428/35, 480, 911; 525/444, 933

[56] References Cited

U.S. PATENT DOCUMENTS

| | | | |
|---|---|---|---|
| 4,398,017 | 8/1983 | Go | 528/173 |
| 4,476,170 | 10/1984 | Jabarin | 428/35 |
| 4,482,586 | 11/1984 | Smith | 428/35 |
| 4,551,368 | 11/1985 | Smith | 525/444 |
| 4,565,851 | 1/1986 | Barbee | 525/437 |
| 4,578,295 | 3/1986 | Jabarin | 428/35 |

*Primary Examiner*—Patricia A. Short
*Attorney, Agent, or Firm*—H. G. Bruss

[57] ABSTRACT

A hollow transparent delamination resistant heatset multilayer article is disclosed where the article includes at least one barrier layer containing a copolyester formed from terephthalic acid, ethylene glycol and 1,3 bis(2-hydroxyethoxy) benzene directly adhered to at least one layer containing poly(ethylene) terephthalate (PET). The multilayer articles are blowmolded using a heatsetting process. The heatset multilayer articles retain high gas barrier properties, uniform thickness in layers, and desirable mechanical strength properties even after the heatsetting process. Also, the multilayer heatset articles have excellent interlayer adhesion without the need for an adhesive layer, high thermal stability, and remain optically clear after the heatsetting process.

11 Claims, No Drawings

HEATSET MULTILAYER CONTAINER

BACKGROUND OF THE INVENTION

This invention relates to biaxially oriented, heatset hollow multilayer containers wherein the containers comprise at least one layer containing poly(ethylene)-terephthalate and at least one layer containing a high barrier copolyester formed from isophthalic or terephthalic acid, ethylene glycol and 1,3,bis(2-hydroxyethyoxy)benzene.

Containers suitable for use in beverage and food packaging applications require an optimal balance of several physical properties. Such containers must be able to withstand the high temperatures reached in hot fill food applications. Also, such containers must have sufficient barrier properties in order to provide a container with an acceptable shelf-like without deterioration of the beverage or food product. Further, it is desirable that such containers be optically clear.

In order to improve several physical properties of hollow articles such as bottles, the bottles have been made from multiple layers of thermoplastic resins. For example, the Yamada et al, U.S. Pat. No. 4,082,854 discloses a multilayer plastic material having at least one layer composed of an ethlenevinyl alcohol copolymer. While the Yamada et al '854 packaging material has acceptable oxygen barrier properties and may be used for hot fill applications, the packaging material lacks optical clarity. Therefore, the use of such packaging material to package food items is restricted to instances where optical clarity is not important.

Yamada et al, U.S. Pat. No. 4,182,457, discloses a multilayer container in which a polypropylene resin layer is oriented in order to improve upon optical clarity of the container. While the optical clarity of such containers is improved by the orientation of the resin layer, such containers lack adequate mechanical strength properties for use in storing carbonated beverages. Also, the containers are not suitable for hot fill applications since the polypropylene materials start to deform and shrink at relatively low onset-of-shrinkage temperatures. Further, these containers generally require an adhesive layer interposed between the oriented thermoplastic resin and the oxygen barrier layer.

Accordingly, there is a need in the art for an improved multilayer hollow article, and in particular a container, which has improved gas barrier properties, good interlayer adhesion without the need for an adhesive layer, desirable mechanical strength properties, optical clarity, and improved thermal stability such that the optically clear multilayer article may be used in hot fill applications.

SUMMARY OF THE INVENTION

The present invention provides a high gas barrier, optically clear, multilayer hollow article which does not require an adhesive layer interposed between the layers comprising the article or container. The multilayer containers of the present invention are an intimate laminate of at least two layers and can be formed using a blowmolding process having a heatsetting step in the manufacturing process of the container.

A prime advantage of the present invention is that the PET/copolyester multilayer article of the present invention is more suitable for use in hot fill applications than the articles disclosed or suggested in the prior art because the multilayer article of the present invention has a relatively high onset-of-shrinkage temperature. The article of the present invention can be filled with a hot substance without deforming or shrinking the PET/copolyester multilayer container.

Another advantage of the present invention is that the PET/copolyester multilayer container exhibits barrier characteristics which make the multilayer container well-suited for beverage and food packaging applications. Also, the containers of the present invention provide significant shelf-life improvements over the articles disclosed or suggested in the prior art.

The present invention provides a multilayer container composed of at least one layer containing poly-(ethylene terephthalate) hereinafter sometimes referred to as PET, and at least one layer containing a high barrier copolyester formed from isophthalic or terephthalic acid, ethylene glycol, and 1,3 bis(2-hydroxyethyoxy)benzene. The use of these two different materials provides a multilayer container having an advantageous balance of mechanical properties and gas barrier properties. The multilayer composition of the present invention is well-suited for use in a variety of food packaging needs including use in hot fill applications.

One process practiced for making the multilayer container of the present invention features co-extruding PET and copolyester into a pipe having a first and a third layer of PET and a middle layer containing the copolyester, cutting the multilayer pipe to an appropriate length, closing one end and forming a multilayer parison, heating the multilayer parison to orientation temperature, inflating in a blow mold which has been preheated to a higher, heatsetting temperature, and holding the multilayer container or other hollow multilayer article against the mold wall for the short time to crystallize the PET and thus heatset the multilayer container.

We have found that another process for making the PET/copolyester multilayer container of the present invention, which is being developed by the industry, is a co-injection molding process wherein the PET and the copolyester are co-injected into a mold and thereafter blowmolded using a heatsetting step.

It is an object of the present invention to provide an improved multilayer hollow article composed of at least one layer containing PET and one layer containing a high barrier copolyester, which multilayer article has excellent interlayer adhesion, high gas barrier properties, excellent thermal stability and is optically clear.

It is a further object to provide such PET/copolyester multilayer hollow article or container having a combination of such superior properties never before disclosed in the art.

Other objects, as well as aspects and advantages, of the present invention will become apparent from a study of the specification.

DETAILED DESCRIPTION OF THE INVENTION

In one of its broadest aspects the present invention provides a multilayer high barrier plastic article containing at least two layers wherein at least one layer of the article contains a high gas barrier copolyester and at least one layer of the article contains poly(ethylene terephthalate). The high gas barrier copolyester is formed from isophthalic or terephthalic acid, ethylene glycol and 1,3, bis(2-hydroxyethyoxy)benzene and is disclosed in U.S. Pat. No. 4,398,017.

According to an important aspect of the present invention, the PET/copolyester multilayer container of the present invention does not require a layer of a glue or adhesive interposed between the PET and copolyester layers. Surprisingly, the PET/copolyester multilayer composition of the present invention maintains excellent interlayer adhesion when a parison made of such composition is stretch blowmolded and heatset into a container.

Another preferred composition of the multilayer high barrier article of the present invention includes a first layer of PET, a second layer containing the high barrier copolyester, and a third layer of PET.

Another preferred composition of the multilayer high gas barrier plastic article of the present invention includes a layer composed of the PET/copolyester multilayer material reground into fine particulate and remelted for inclusion into an extruded multilayer pipe which is formed into a multilayer parison. The reground layer is typically a physical admixture of scrap PET/copolyester multilayer containers which is ground into granules, pellets or flakes and introduced into a conventional screw extruder. Such mixing extruders are well-known in the art and are commercially available. The regrind material can be included in the multilayer article of the present invention as the second layer. In an alternative embodiment, the regrind material can be inserted as a third or fourth layer between the PET layer and the high barrier copolyester containing layer. These embodiments of the present invention have excellent gas barrier characteristics, good interlayer adhesion, a high onset-of-shrinkage temperature and are optically clear. In addition, such articles also minimize waste by recycling scrap multilayer material into additional multilayer containers.

Still another embodiment of the multilayer high gas barrier plastic article of the present invention comprises a pair of outer layers of PET and one or more regrind layers containing the high barrier copolyester adjacent a central core layer containing the high gas barrier copolyester.

In addition, other multilayer containers are covered by the present invention. For example, the multilayer container of the present invention may have a layer of PET and a layer of the high barrier copolyester, or any of the following variations such as a first layer of PET, a second layer containing the mixture of PET and high barrier copolyester, a third layer containing the high barrier copolyester, and a fourth layer of PET. Alternatively, the structure of the present invention may contain a first layer containing the mixture of PET and high barrier copolyester, a second layer of copolyester, and a third layer of PET. Other such examples of the present invention can be readily understood from the description contained herein.

In the multilayer container of the present invention it is particularly advantageous to have the PET/high barrier copolyester container contain no more than from about 10% to about 30%, by weight, of the high barrier copolyester. While higher percentages of the high barrier copolyester can be included in the multilayer container, there is a need to have a balance between the desired properties of the container and the economics of producing such container.

PET materials useful in the present invention are poly(ethylene terephthalate) polymers including polymers where at least 97% of the polymer contains the repeating ethylene terephthalate units with the remainder being minor amounts of ester-forming components, and copolymers of ethylene terephthalate wherein up to about 10 mole percent of the polymer is prepared from the monomer units selected from butane-1,4-diol; diethylene glycol; propane-1,3-diol; poly(tetramethylene glycol); poly(ethylene glycol); poly(propylene glycol); 1,4-hydroxymethylcyclohexane and the like, substituted for the glycol moiety in the preparation of the polymer, or isophthalic; naphthalene, 1,4- or 2,6-dicarboxylic; adipic; sebacic; decane-1,10-dicarboxylic acids, and the like, substituted for up to 10 mole percent of the acid moiety (terephthalic acid) in the preparation of the polymer.

The poly(ethylene terephthalate) polymer can include various additives that do not adversely affect the polymer. For instance, some such additives are stabilizers, e.g., antioxidants or ultraviolet light screening agents, extrusion aids, additives designed to make the polymer more degradable or combustible, and dyes or pigments. Moreover, cross-linking or branching agents such as are disclosed in U.S. Pat. No. 4,188,357 can be included in small amounts in order to increase the melt strength of the poly(ethylene terephthalate).

The copolyesters, which form the high barrier copolyester layer are copolyesters based on terephthalic or isophthalic acid or both, ethylene glycol and which contain 1,3 bis(2-hydroxyethoxy)benzene as one of the diol reactants in order to prepare the solid copolyesters. Such copolyesters are disclosed in U.S. Pat. No. 4,398,017 which is incorporated in full herein by reference. The solid thermoplastic copolyesters are formed of the polymeric reaction product of:

(A) reactant(s) selected from isophthalic acid, terephalic acid, and their $C_1$ to $C_4$ alkyl esters, and any mixture thereof in any proportion, (B) reactants, 1,3 bis(2-hydroxyethoxy)benzene plus ethylene glycol, and optionally one or more other ester forming dihydroxy organic hydrocarbon reactant(s), and, optionally, (C) reactant, bis(4-beta-hydroxyethoxyphenyl)sulfone, wherein (1) the amount of said 1,3 bis(2-hydroxyethoxy)benzene is 5–90, usually not less than 10 or more than 80, mole percent of the amount of (A) reactants, (2) the combined amount of (B) and (C) reactant is about 110 to 300 mole percent of the amount of (A) reactants, (3) the amount of said other ester forming dihydroxy organic hydrocarbon reactant(s) is zero to 20, usually zero to 15, mole percent of the amount of said (A) reactants, and (4) the combined amount of said (C) reactant plus said 1,3 bis(2-hydroxyethoxy)benzene and said other ester forming dihydroxy organic hydrocarbon reactant(s) is not over 90 mole percent of said (A) reactants.

In the foregoing copolyesters the optional (C) reactant, bis(4-beta-hydroxyethoxyphenyl)sulfone, is used when it is necessary to raise the glass transition temperature for a particular application or use.

When less than 5 mole percent of 1,3 bis(2-hydroxyethoxy)benzene is used, the effect on permeabilities is not as significant as desired. When over 90 mol percent is used, the reaction or polycondensation rate is lower than desired.

The copolyesters so produced are solid copolyesters having an inherent viscosity of about 0.4 dl/g., usually at least 0.5 and for most commercial applications, at least 0.7 dl/g.

The multilayer container of the present invention is preferably practiced with coextruded parisons made of first layer of PET, a second layer containing the high barrier copolyester, and a third layer of PET. Such parisons are generally elongate tubes of cylindrical cross-section which have an open upper threaded finish which accepts a closure, a cylindrical elongate main body portion, and a closed hemispherical bottom portion. The parison when expanded results in a narrow neck container having a generally cylindrical main body portion and a closed hemispherical bottom portion. Such parisons and final container shapes are preferred but other geometrical configurations may be selected within the scope of the present invention.

The multilayer containers of the present invention may be formed by a blowmolding process which includes a heatsetting step. The multilayer parisons can be either injection molded or co-extruded and can be preheated to the orientation range by conventional parison preheaters available in the marketplace.

The PET/high barrier copolyester multilayer parisons may also be blowmolded by first blowing a parison in a small mold, subsequently blowing it in a larger mold, and heatsetting the blown container while in the larger mold. The blown containers can thereafter be oriented using a heatsetting step. In addition, various other processes for blowmolding a parison that includes a heatsetting step in such process can be practiced for producing the multilayer containers of the present invention such as disclosed in U.S. Pat. Nos. 4,476,170 and 4,512,948 which are incorporated by reference herein.

The following Tables illustrate the superior properties of the multilayer containers of the present invention as compared with conventional containers fabricated from PET and PET/copolyester nonheatset multilayer containers. The containers are conventionally shaped narrow neck, cylindrical sidewalled containers having hemispherical bottoms. The multilayer containers of the present invention show excellent gas barrier properties, very high interlayer adhesion, interlaminar peel strength, and excellent optical clarity, and retain excellent mechanical properties.

Crystallinity for multilayer heatset and non-heatset 46 oz. orange juice containers is shown in Table I. When the multilayer container of the present invention was heatset at 230° C. for 10 seconds, crystallinity of PET was found to be about 52–53%, which percentage of crystallinity is much higher than the 28% crystallinity of PET in the non-heatset container. We found that even though the multilayer structure was heatset, we obtained a high degree of crystallinity.

TABLE I

| | Crystallinity | |
|---|---|---|
| | PET/29% Copoly/PET Non-Heatset | PET/29% Copoly/PET Heatset |
| Temp. | 25° C. | 230° C. |
| Time | 5 Sec. | 10 Sec. |
| Composite Density | 1.3580 | 1.3790 |
| Density of PET | 1.3678 | 1.3990% |
| Cryst. of PET | 28.3% | 52.2% |

The data of Table II show the whole package oxygen barrier test for different containers. These containers were highly oriented.

The PET/copolyester/PET multilayer heatset container of the present invention shows a 36% improvement in $O_2$ barrier properties over the PET non-heatset container. Further, the PET/copolyester multilayer heatset container of the present invention shows that substantial improvement in $O_2$ barrier properties over the non-heatset PET/copolyester multilayer container. We found that it is possible to heatset a PET/high barrier copolyester multilayer container and obtain improved gas barrier properties, despite the fact that the high barrier copolyester material has a significantly lower softening temperature than the temperature reached during the heatsetting orientation step.

TABLE II

| | Barrier Properties | |
|---|---|---|
| Whole Package Container | Normalized $O_2$ Barrier | % Improvement Over PET |
| PET Non-heatset | 1.0 | — |
| PET/20% Copoly/PET Non-heatset | 0.82 | 18% |
| PET Heatset | 0.78 | 22% |
| PET/20% Copoly/PET Heatset | 0.64 | 36% |

The high barrier copolyester containing layer of the PET/copolyester multilayer container of the present invention remains uniform in its thickness even after the heatsetting orientation step. The data in Table III illustrate that even though the high barrier copolyester resin and the PET have different flow characteristics, the material distribution remains the same.

TABLE III

| Material Distribution (Multilayer) Sample: PET/13% copolyester/PET Containers | | |
|---|---|---|
| | % COPOLYESTER | |
| Position (from the finish) | Non-heatset | Heatset |
| 3" | 13.07 | 13.00 |
| 6¼" | 13.04 | 13.90 |
| 8¼" | 12.17 | 14.00 |
| 9¼" (bottom) | 12.72 | 13.30 |

The multilayer containers of the present invention show significant improvement in barrier properties to gases, such as water and oxygen, without sacrificing desirable mechanical strength properties. The results set forth below are for PET-copolyester/PET multilayer containers composed of PET/29% copolyester/PET. The mechanical properties of multilayer heatset and non-heatset containers are shown in Table IV.

With respect to the physical properties described in Table IV, such properties are defined herein as follows: Modulus is the measure of the stiffness of the containers, as defined by ASTM standard D-638. Yield stress is defined as the resistance to creep under heat and/or pressure of a container wall portion, as defined by ASTM standard D-638. Yield strain is defined as the percent of elongation to which a section of containers may be subjected and then not return 100% to its original dimensions by elastic recovery, as defined by ASTM standard D-638. Ultimate strength is a measure of the internal pressurization which a container can tolerate prior to irrevocable rupture, as defined in ASTM standard D-638. Ultimate elongation is a measure of impact strength of the material, as defined in ASTM standard D-638. The hoop yield stress for heatset multilayer container was found to be slightly lower than non-heatset container, while other mechanical properties were found to be favorably comparable. These results indicate that the mechanical properties desirable in food packaging containers are not sacrificed or deteriorated by heatsetting the PET/copolyester multilayer containers of the present invention.

TABLE IV

Mechanical Properties of Multilayer Container

| Property | Multilayer Non-Heatset | | Multilayer Heatset | |
|---|---|---|---|---|
| | Axial | Hoop | Axial | Hoop |
| Elastic modulus, kpsi | 362 | 625 | 478 | 758 |
| | 25 | 35 | 41 | 34 |
| Yield stress, kpsi | 11.2 | 28.4 | 14.3 | 24.4 |
| | 0.7 | 1.0 | 0.3 | 0.8 |
| Yield strain, % | 7.0 | 6 | 6.4 | 6 |
| | 0.4 | — | 0.4 | — |
| Ultimate strength, kpsi | 13.2 | 34.1 | 14.3 | 36.8 |
| | 2.5 | 1.6 | 0.9 | 1.9 |
| Ultimate elongation | 65 | 14 | 40 | 16 |
| | 16 | 1 | 15 | 1 |
| Experimental Conditions | | | | |
| Tc, °C. | 25° C. | | 230° C. | |
| tc, sec. | 5 Sec. | | 10 Sec. | |

Another important advantage of the present invention is that the heatset PET/copolyester multilayer containers are useful in hot fill applications. In hot filled foods, such as catsup or soy sauce, and pasteurized foods, such as beer, it is critical that the containers not only have good barrier properties and good mechanical strength properties but also that the containers resist shrinkage and gross deformation upon exposure to the elevated hot filling and pasturization temperatures.

As the data in Table V illustrate, the PET/copolyester multilayer heatset containers have an improved resistance to shrinkage and to gross deformations in shape upon exposure to an elevated temperature. We have found that the onset-of-shrinkage temperature for the PET/copolyester multilayer heatset container of the present invention is essentially identical to the onset-of-shrinkage temperature of the PET heatset container. This is surprising since the high barrier copolyester has a lower onset-of-shrinkage temperature than the onset-of-shrinkage temperature for the multilayer PET/copolyester heatset container of the present invention.

Thermal stability of the container is determined by measuring the onset temperature of shrinkage. The onset-of-shrinkage temperature referred to herein was determined as described in Brady and Jabarin "Thermal Treatment of Cold-Formed Poly(Vinyl Chloride) Polymer Engineering and Science", pp. 686–90 of Vol. 17, No. 9, September 1977, except that the samples were cut from the sidewalls of the bottles. No thermal treatment was effected on the cut samples prior to the tests. The onset temperature of shrinkage for the sidewall of various containers is described in Table V.

TABLE V

| Onset-of-shrinkage | |
|---|---|
| Single Layer PET Heatset | 110° C. |
| Multilayer PET/Copolyester/ PET Heatset | 110° C. |
| PET Non-Heatset | 60° C. |

According to another important feature of the present invention, the heatset multilayer container of the present invention shows excellent interlaminar peel strength between the multilayers without the need for an adhesive layer interposed between the PET and copolyester containing layers. We found that no adhesive layer is needed despite the fact that the multilayer container of the present invention is subjected to high temperatures during the blowmolding and heatsetting process. The data in Table VI illustrate that the interlaminar peel strength of the heatset copolyester multilayer container of the present invention is essentially identical to the non-heatset multilayer container.

TABLE VI

| PEEL STRENGTH | |
|---|---|
| Material | Peel Strength lb. force/inch width |
| PET/13% copolyester/PET Non-heatset | 0.4 0.2 |
| PET/13% copolyester/PET Heatset | 0.55 0.17 |

Still another important feature of the present invention is that the PET/copolyester heatset multilayer containers are optically clear. As the data of Table VII show, the optical clarity of the heatset PET/copolyester containers of the present invention are favorably comparable with the non-heatset multilayer containers. The PET/copolyester heatset multilayer containers are suitable for use in applications where optical clarity of the containers is desired. The optical clarity of the containers was measured by determining the percentage of haze on a Gardner hazemeter. Samples tested showing a haze value of 10% or less are considered in the industry to be optically clear. As the data in Table VII illustrate, the percentage of haze for both the PET/copolester multilayer heatset and non-heatset containers, by weight, are significantly lower than the 10% standard haze value and are therefore optically clear.

TABLE VI

| Haze Measurements | |
|---|---|
| Sample | % Haze |
| PET/29% Copolyester/PET Non-Heatset | 4.8 |
| PET/29% Copolyester/PET Heatset | 5.8 |
| PET/13% Copolyester/PET Non-Heatset | 0.8 |
| PET/13% Copolyester/PET Heatset | 2.1 |

From the foregoing description, it will be appreciated that the PET/copolyester multilayer heatset containers of the present invention have several important advantages: The heatset PET/copolyester multilayer containers of the present invention have excellent gas barrier properties, retain a uniform thickness in the layer containing the high barrier copolyester, retain desirable mechanical strength properties, remain thermally stable, show great interlaminar peel strength, and remain optically clear after the heatsetting step. As a consequence, the PET/copolyester multilayer heatset containers of the present invention are specially well-suited for use in such applications which need a high gas barrier optically clear container and which containers can be used in hot fill applications.

All patents and documents referred to herein are hereby incorporated by reference.

As will be evident to those skilled in the art, various modifications of this invention can be made or followed in the light of the foregoing disclosure and discussion without departing from the spirit and scope of the disclosure or from the scope of the claims.

We claim:

1. A transparent hollow delamination resistant, thermally stable multilayer article obtained by blowmolding and heatsetting a parison composed of at least one layer containing poly(ethylene terephthalate) directly adhered to at least one barrier layer containing a copolyester which consists essentially of: (A) reactant(s) selected from the group consisting of isophthalic acid, terephalic acid, and their $C_1$ and $C_4$ alkyl esters, and any mixture thereof in any proportion; (B) reactant(s) 1,3 bis(2-hydroxyethoxy)benzene plus ethylene glycol, and optionally one or more other ester forming dihydroxy organic hydrocarbon reactant(s), and optionally, (C) reactant, bis(4-beta-hydroxyethoxyphenyl)sulfone, wherein:

(1) the amount of said 1,3 bis(2-hydroxyethoxy)benzene is 5 to 90 mole percent of the amount of (A) reactant(s), (2) the combined amount of (B) and (C) reactant is about 110 to 300 mole percent of the amount of (A) reactants, (3) the amount of said ester forming dihydroxy organic hydrocarbon reactant(s) is zero to 20 mole percent of the amount of said (A) reactants, and (4) the combined amount of said (C) reactant plus said 1,3 bis(2-hydroxyethoxy)benzene and said other ester forming dihydroxy organic hydrocarbon reactant(s) is not over 90 mole percent of said (A) reactants, said copolyester being present in an amount from about 10 percent to about 30 percent, by weight, of said article.

2. The multilayer article of claim 1 wherein said parison is composed of a first and a third layer consisting essentially of poly(ethylene terephthalate) directly adhered to a second layer consisting essentially of said high barrier copolyester interposed between said first and third layers.

3. The multilayer article of claim 1 wherein said parison is composed of a first layer and a third layer consisting essentially of poly(ethylene terephthalate) directly adhered to a second layer consisting essentially of a mixture of poly(ethylene terephthalate) and said high barrier copolyester.

4. The multilayer article of claim 1 wherein said parison is composed of a first layer consisting essentially of poly(ethylene terephthalate) directly adhered to a second layer consisting essentially of a mixture of poly(ethylene terephthalate) and said high barrier copolyester.

5. The multilayer article of claim 1 wherein said parison is composed of a first layer consisting essentially of poly(ethylene terephthalate) directly adhered to a second layer consisting essentially of said high barrier copolyester, said second layer being directly adhered to a third layer consisting essentially of a mixture of said poly(ethylene terephthalate) and said high barrier copolyester.

6. The multilayer article of claim 1 wherein said parison is composed of a first layer and a third layer consisting essentially of a mixture of poly(ethylene terephthalate) and said high barrier copolyester, said first and third layers directly adhered to a second layer consisting essentially of said high barrier copolyester interposed between said first and third layers.

7. The multilayer article of claim 1 wherein said parison is composed of a first layer consisting essentially of poly(ethylene terephthalate) directly adhered to a second layer consisting essentially of a mixture of poly(ethylene terephthalate) and said high barrier copolyester, said second layer directly adhered to a third layer consisting essentially of said high barrier copolyester, said third layer being directly adhered to a fourth layer consisting essentially of poly(ethylene terephthalate).

8. The multilayer article of claim 1 wherein said parison is composed of a first layer and a third layer consisting essentially of a mixture of poly(ethylene terephthalate) and said high barrier copolyester, said first and third layers directly adhered to a second layer consisting essentially of poly(ethylene terephthalate) interposed between said first and third layers.

9. The multilayer article of claim 1 wherein said parison is composed of a first layer consisting essentially of a mixture of poly(ethylene terephthalate) and said high barrier copolyester directly adhered to a second layer consisting essentially of poly(ethylene terephthalate).

10. The multilayer article of claim 1 wherein said parison is composed of a first layer consisting essentially of a mixture of poly(ethylene terephthalate) and said high barrier copolyester directly adhered to a second layer consisting essentially of said high barrier copolyester, said second layer directly adhered to a third layer consisting essentially of poly(ethylene terephthalate), said third layer being directly adhered to a fourth layer consistng essentially of a mixture of poly(ethylene terephthalate) and said high barrier copolyester.

11. The multilayer article of claim 1 wherein said parison is composed of a first layer consisting essentially of poly(ethylene terephthalate) directly adhered to a second layer consisting essentially of a mixture of poly(ethylene terephthalate) and said high barrier copolyester, said second layer directly adhered to a third layer consisting essentially of said high barrier copolyester, said third layer being directly adhered to a fourth layer consisting essentially of a mixture of poly(ethylene terephthalate) and said high barrier copolyester, said fourth layer being directly adhered to a fifth layer consisting essentially of poly(ethylene terephthalate).

* * * * *